(12) United States Patent
Jeffrey (10) Patent No.: US 10,242,606 B1
(45) Date of Patent: Mar. 26, 2019

(54) NOVELTY ITEM FOR CAMERAS

(71) Applicant: Tyler Jeffrey, La Grange, IL (US)

(72) Inventor: Tyler Jeffrey, La Grange, IL (US)

(*) Notice: Subject to any disclaimer, the term of this patent is extended or adjusted under 35 U.S.C. 154(b) by 0 days.

(21) Appl. No.: 15/824,853

(22) Filed: Nov. 28, 2017

(51) Int. Cl.
*A63H 37/00* (2006.01)
*G03B 17/56* (2006.01)
*G09F 19/12* (2006.01)

(52) U.S. Cl.
CPC ............ *G09F 19/12* (2013.01); *A63H 37/00* (2013.01); *G03B 17/566* (2013.01)

(58) Field of Classification Search
CPC .......................... G03B 17/566; G03B 17/568
USPC ......................................... 396/544, 337, 422
See application file for complete search history.

(56) References Cited

U.S. PATENT DOCUMENTS

| | | | |
|---|---|---|---|
| 3,687,030 A | 8/1972 | Dine et al. | |
| 5,787,618 A | 8/1998 | Mullis | |
| 5,848,310 A * | 12/1998 | Baker | G03B 17/561 396/429 |
| 5,950,017 A | 9/1999 | Reff | |
| 6,241,620 B1 | 6/2001 | Santa Cruz et al. | |
| 6,250,005 B1 | 6/2001 | Richards | |
| 7,883,222 B2 * | 2/2011 | Elias | G03B 11/045 353/97 |
| 8,385,004 B2 * | 2/2013 | Hicks | G03B 41/00 359/699 |
| 9,883,016 B2 * | 1/2018 | Eromaki | H04M 1/0254 |
| 2004/0018881 A1 | 1/2004 | Hall | |
| 2010/0080543 A1 * | 4/2010 | Yu | G03B 15/00 396/5 |
| 2012/0163782 A1 * | 6/2012 | McColl | G03B 15/06 396/3 |
| 2017/0341597 A1 * | 11/2017 | Buss | B60S 1/56 |

FOREIGN PATENT DOCUMENTS

WO     2016/164969     10/2016

OTHER PUBLICATIONS

Ferguson, How to do Car Camera Scare Prank (Sep. 2016) YouTube video https://www.youtube.com/watch?v=8D1wK29Pnnk.*

* cited by examiner

*Primary Examiner* — Christopher E Mahoney
(74) *Attorney, Agent, or Firm* — Neal, Gerber & Eisenberg LLP (57) ABSTRACT

A novelty item is described that can be attached to a camera or other object as a prank for humor and entertainment purposes. The novelty item may include an image that can be seen by a viewer of the camera. The novelty item may include a central portion having the image, foldable flap portions flexibly connected to the central portion, and a fastener for attaching the novelty item to the camera. The image may be properly placed and aligned to be in field of view of the camera due to the shape and dimensions of the central portion and flap portions, when the novelty item is fully folded. The novelty item may be inconspicuous and easily attachable.

20 Claims, 5 Drawing Sheets

NOVELTY ITEM FOR CAMERAS

TECHNICAL FIELD

This application generally relates to a novelty item that can be attached to a camera as a prank for humor and entertainment purposes. In particular, this application relates to a novelty item that includes a central portion having an image, foldable flap portions flexibly connected to the central portion, and a fastener for attaching the novelty item such that the image is viewable by a camera.

BACKGROUND

Many vehicles have backup cameras located on the rear for aiding drivers when backing up or travelling in reverse. The backup cameras can help drivers to view and avoid other vehicles, persons, and/or other objects that may be difficult or impossible to see because the objects are in a blind sport behind the vehicle. Backup cameras often have a wide angle or fisheye lens and are pointed downward so that any objects behind the vehicle can be more easily seen.

Drivers can see the view from the backup camera on displays that are typically located on the dashboard or head unit. When the vehicle is not in a reverse gear, the displays usually show information to the driver and passengers, such as maps, radio or media information, and/or other content. When the vehicle is placed in reverse gear, the displays automatically switch to show the view from the backup camera.

With the prevalence of backup cameras on vehicles, some people have taken advantage of this automatic view switching to play jokes or pranks on their friends or family members who are driving or riding in the vehicles. For example, objects that are irregularly shaped and relatively large (e.g., dolls, toys, etc.) can be attached with duct tape to backup cameras so that drivers and passengers are surprised to see the objects when they place the vehicle in reverse gear, instead of the regular rear view they are expecting to see. However, playing jokes or pranks in this manner can be unsuccessful because attaching such irregularly-shaped objects to backup cameras can be cumbersome, the objects may fall off, the objects may be easily seen by others, and the objects can appear unrealistic and implausible in the display and/or unacceptably obscure the field of view of the camera, e.g., the objects must begin from an edge (i.e., bottom, top, or side) of the view of cameras and cannot be placed in the middle of the view of the cameras. Furthermore, the license plate or other parts of the vehicle may be covered or obscured by the duct tape used to attach the object. As such, the elements of surprise and entertainment may be reduced or eliminated when playing a joke or prank using existing devices and methods.

Accordingly, there is an opportunity for a novelty item that addresses these concerns. More particularly, there is an opportunity for a novelty item that attaches to cameras and is inconspicuous and easily attachable for use in playing jokes or pranks for humor and entertainment purposes.

SUMMARY

The instant disclosure solves the above-noted problems by providing a novelty item that is designed to, among other things: (1) quickly and easily attach to a camera; (2) provide the proper placement and alignment of an image on the novelty item in the field of view of the camera; and (3) have the image appear realistic to persons looking at a view from the camera.

In one embodiment, a novelty item for attachment to a vehicle backup camera is provided. The novelty item may be adapted to present an illusion of an image in a field of view of the vehicle backup camera. The novelty item may include a central portion, a first flap portion flexibly connected to a first end of the central portion, a second flap portion flexibly connected to a second end of the central portion, a mounting fastener disposed on a front surface of the first flap portion, and a closing fastener disposed on a rear surface of the first flap portion. The central portion may include a white layer disposed thereon and the image disposed on the white layer such that the image has opacity. The first flap portion may have a first slit to facilitate folding, and the second flap portion may have a second slit to facilitate folding. The first flap portion may overlap with the second flap portion when the first and second flap portions are folded. The mounting fastener may be adapted to attach the novelty item to the vehicle backup camera. The closing fastener may be adapted to secure the first and second flap portions together when the first and second flap portions are folded. When the first and second flap portions are folded and secured together, the first and second flap portions may each comprise a hole that substantially aligns with the other hole and with at least a part of the image, each hole may be adapted to accept the vehicle backup camera, and the image may be substantially viewable in the field of view of the vehicle backup camera when the novelty item is attached to the vehicle backup camera.

In another embodiment, a novelty item for attachment to a vehicle backup camera is provided. The novelty item may be adapted to present an illusion of an image in a field of view of the vehicle backup camera. The novelty item may include a central portion comprising the image, a first flap portion flexibly connected to a first end of the central portion, a second flap portion flexibly connected to a second end of the central portion, a mounting fastener adapted to attach the novelty item the vehicle backup camera, and a closing fastener adapted to secure the first and second flap portions together when the first and second flap portions are folded. At least part of the first flap portion may overlap with at least part of the second flap portion when the first and second flap portions are folded. The first and second flap portions may each comprise an opening that is adapted to accept the vehicle backup camera, and the image may be substantially viewable in the field of view of the vehicle backup camera when the novelty item is attached to the vehicle backup camera.

In a further embodiment, a novelty item for attachment to a vehicle backup camera is provided. The novelty item may be adapted to present an illusion of an image in a field of view of the vehicle backup camera. The novelty item may include a central portion comprising a front surface having the image disposed thereon, a first flap portion flexibly connected to a first distal end of the central portion and comprising a first hole, a second flap portion flexibly connected to a second distal end of the central portion and comprising a second hole, a mounting fastener adapted to attach the novelty item to the vehicle backup camera, and a closing fastener adapted to secure the first and second flap portions together when the first and second flap portions are fully articulated to lie in contact with one another. The first and second holes may be adapted to accept the vehicle backup camera and define an opening therethrough, and the vehicle backup camera may have an unobstructed view of the image through the opening when the novelty item is attached to the vehicle backup camera.

These and other embodiments, and various permutations and aspects, will become apparent and be more fully understood from the following detailed description and accompanying drawings, which set forth illustrative embodiments that are indicative of the various ways in which the principles of the instant disclosure may be employed.

DETAILED DESCRIPTION

The description that follows describes, illustrates and exemplifies one or more embodiments of the instant disclosure in accordance with its principles. This description is not provided to limit the instant disclosure to the embodiments described herein, but rather to explain and teach the principles of the instant disclosure in order to enable one of ordinary skill in the art to understand these principles and, with that understanding, be able to apply them to practice not only the embodiments described herein, but also any other embodiment that may come to mind in accordance with these principles. The scope of this disclosure is intended to cover all such embodiments that may fall within the scope of the appended claims, either literally or under the doctrine of equivalents. Any of the features of an embodiment discussed with reference to the figures herein may be combined with or substituted for features discussed in connection with other embodiments in this disclosure.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the instant disclosure as taught herein and understood by one of ordinary skill in the art.

The novelty item described herein can be inconspicuous and be easily attachable to an object, including a backup camera of a vehicle. Persons using the novelty item can play jokes or pranks on the driver and passengers of a vehicle for humor and entertainment purposes. In some embodiments, the novelty item may be used for other purposes, e.g., as a scale or distance gauge. In particular, the novelty item can include an image that can be seen by a driver and passengers in a vehicle via the backup camera. The image may be in the middle of the view of the camera and can surprise the driver and passengers when the vehicle is placed in reverse gear since they would be expecting to see only the environment behind the vehicle, e.g., pavement, trees, other vehicles, etc., instead of the image on the novelty item that is integrated with the environment behind the vehicle. The novelty item can be quickly attached and placed so that the image is properly aligned within the field of view of the camera such that the image appears deep in the field of view, instead of merely right behind the camera.

The image on the novelty item can have opacity such that the image appears realistic, as compared to the mere taping of an object (e.g., doll) to the camera. Also, there are numerous creative and personalized ways for the image on the novelty item to be presented on the view of the camera, such as by having borders, words, imaginary items, etc. while still allowing the majority of the view from the camera to be unobscured. For example, the image on the novelty item could include various designs, messages, and/or advertising, such as Christmas garlands, logos, personalized messages (e.g., "Marry Me"), etc. Furthermore, because the novelty item can be mostly transparent except for the image, the novelty item may not be easily noticed by persons looking at the vehicle and allows the environment behind the vehicle to still be seen in the view from the camera. In addition, the novelty item may be securely attached to the camera, but also be easily removable, e.g., after the prank is completed.

Figure 1:
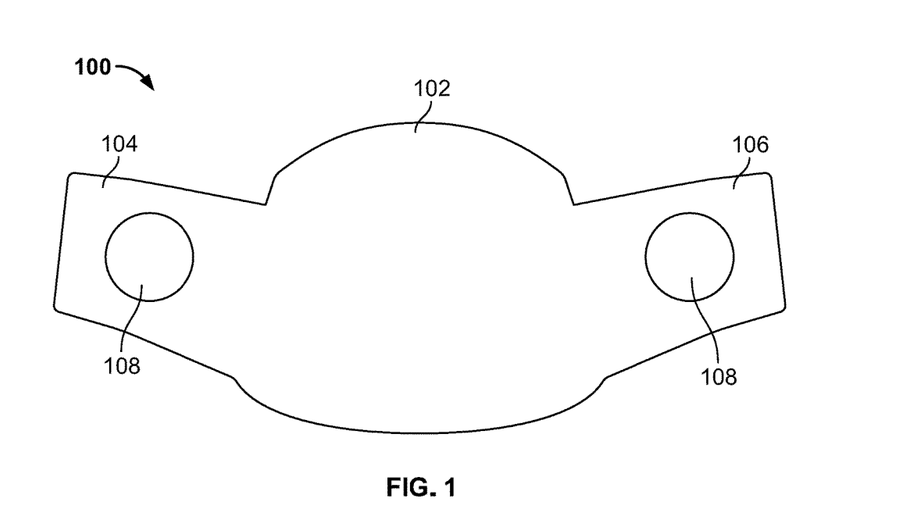
FIG. 1 is a plan view of an embodiment of a novelty item in an unfolded state.
Figure 2:
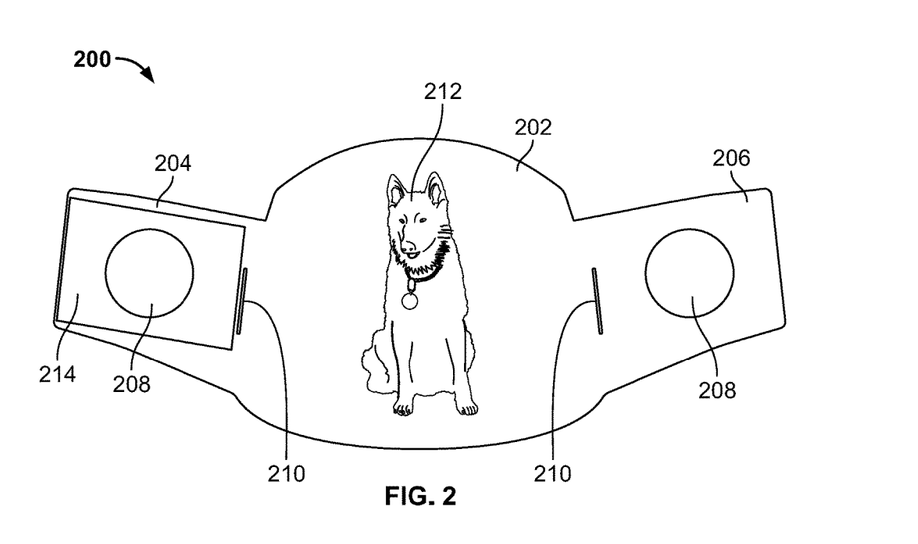
FIG. 2 is a plan view of an embodiment of a novelty item having an exemplary image and in an unfolded state.

FIGS. 1-2 show embodiments of exemplary novelty items 100, 200, respectively, in an unfolded state, i.e., prior to being attached to an object such as a backup camera. For example, the novelty item 100, 200 as shown in FIGS. 1-2 may be in the unfolded state after it is manufactured and when it is sold. The novelty items 100, 200 may respectively include a central portion 102, 202; a first flap portion 104, 204 flexibly connected to the central portion 102, 202 on one end; and a second flap portion 106, 206 flexibly connected to the central portion 102, 202 on an opposite end.

The flap portions 104, 204 and 106, 206 can be folded or articulated so that they can overlap each other, as described in more detail below with respect to FIGS. 5-6. To aid a user in folding the flap portions 104, 204 and 106, 206, the area between each flap portion 104, 204 and 106, 206 and the central portion 102, 202 may be a living hinge, for example. In other embodiments, the area between each flap portion 104, 204 and 106, 206 and the central portion 102, 202 may be creased or perforated to aid a user in folding the novelty item 100, 200. As shown in the embodiment of FIG. 2, the novelty item 200 may also include slits 210 in the area between each flap portion 204 and 206 and the central portion 202 to aid a user in folding the novelty item 200. If a perforation is included in the area between each flap portion 104, 204 and 106, 206 and the central portion 102, 202, the flap portions 104, 204 and 106, 206 could be torn off so that the central portion 102, 202 can be retained, e.g., if the central portion 102, 202 includes information for use as a business card, greeting card, or promotion.

The central portion 202 may include an image 212 for viewing when the novelty item 200 is attached to a backup camera of a vehicle. It should be noted that it is contemplated that the novelty item 200 could be attached to any suitable object, such as a digital camera, video camera, smartphone camera, webcam, security camera, etc. The exemplary image 212 shown in FIG. 2 is of a dog, but any suitable image may be included on the central portion 202, such as a person, face, scary image, etc. The image 212 may be printed on the central portion 202 using toner/ink digital printing or any other suitable method, such as offset printing or rotogravure printing. In some embodiments, a white layer may be printed on a front surface of the central portion 202 and the image 212 may be printed on the white layer, or alternatively, the image 212 may be printed on a rear surface of the central portion 202 and a white layer may be printed on back of the image 212. In this way, the image 212 will be more opaque and will appear more realistic when viewed through a camera. In other embodiments, the image 212 may be printed on a front surface of the central portion 202. In some embodiments, a white layer and/or the image 212 may be printed on a rear surface of the central portion 202. In further embodiments, the image 212 may be on a sticker that is adhered to the central portion 202.

In embodiments, the novelty item 100, 200 may be primarily transparent and be composed of a transparent film that is lightweight and has sufficient rigidity. For example, the film may be 6 to 10 mils thick and may be composed of vinyl, acrylic, CPVC, and/or any suitable material. In embodiments, the film composing the novelty item 100, 200 may have a matte, satin, or similar finish with sufficient optical clarity, in order to minimize or eliminate glare on the novelty item 100, 200 due to vehicle or external lighting, when the novelty item 100, 200 is attached to a vehicle backup camera. In other embodiments, such glare may be minimized or eliminated by the application of an anti-reflective coating to one or more surfaces of the film composing the novelty item 100, 200.

The flap portions 104, 204 and 106, 206 may include holes 108, 208. When the flap portions 104, 204 and 106, 206 are fully folded or articulated, the holes 108, 208 may generally align with one another, as best shown in FIG. 6. The holes 108, 208 may be configured to accept and fit over a camera 702 of a vehicle 700, as shown in FIG. 7, as described in more detail below.

Figure 3:
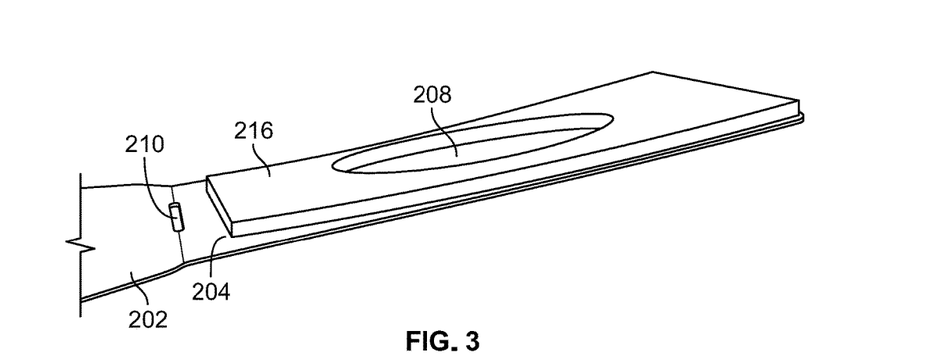
FIG. 3 is a detail perspective view of an embodiment of a mounting fastener on a flap portion of a novelty item.
Figure 4:
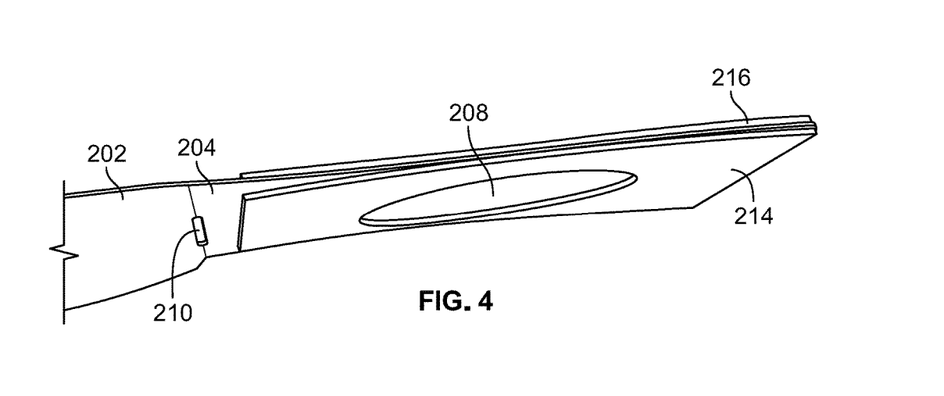
FIG. 4 is a detail perspective view of an embodiment of a closing fastener on a flap portion of a novelty item.

As shown in FIGS. 3-4, the flap portion 204 may include a closing fastener 214 for securing the flap portions 204 and 206 to each other, and a mounting fastener 216 for attaching the novelty item 200 to an object, e.g., a backup camera of a vehicle. In embodiments, the closing fastener 214 may be on a front surface of the flap portion 204, and the mounting fastener 216 may be on a rear surface of the flap portion 204. In other embodiments, the closing fastener 214 and the mounting fastener 216 may be on the surfaces of the flap portion 206, or on a combination of the front and rear surfaces of the flap portion 204 and/or the flap portion 206.

In embodiments, the closing fastener 214 may be double-sided tape. For example, one side of the tape may be attached to the front surface of the flap portion 204, e.g., during manufacture of the novelty item 200. The other side of the tape may be configured to be attached to the rear surface of the flap portion 206 when the flap portions 204 and 206 are fully folded. For example, a user of the novelty item 200 may remove a liner in order to expose an adhesive for adhering the closing fastener 214 to the flap portion 206 so that the flap portions 204 and 206 are secured together. In some embodiments, the closing fastener 214 may be another suitable fastener, such as magnets, Velcro, etc. In other embodiments, the flap portions 204 and 206 may have open-ended slits that can interlock with one another to secure the flap portions 204 and 206 together, or the flap portions 204 and 206 may have a tab and corresponding slot that secures the flap portions 204 and 206 together.

In embodiments, the mounting fastener 216 may be double-sided tape that is relatively thick and rubbery, such as 45 mil thick structural grade tape composed of an integral core of solid acrylic polymer. For example, one side of the tape may be attached to the rear surface of the flap portion 204, such as during manufacture of the novelty item 200. The other side of the tape may be attached to an object, e.g., a backup camera, after the user removes a liner to expose an adhesive. Because the mounting fastener 216 may be attached to uneven surfaces (e.g., the exterior of a vehicle and/or a backup camera), the use of such tape may allow for good adhesion while also being easily removable, such as after the prank is completed. In embodiments, the mounting fastener 216 may be another suitable fastener, such as magnets, Velcro, etc.

Figure 5:
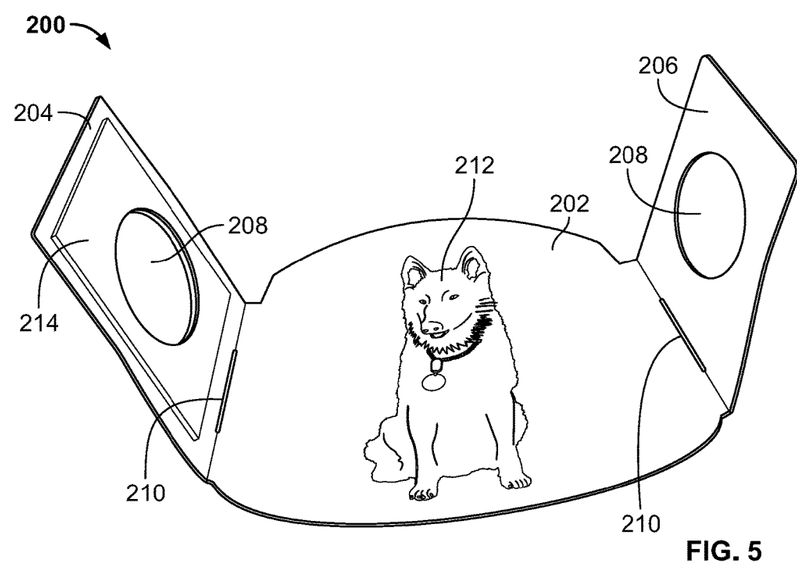
FIG. 5 is a perspective view of the novelty item of FIG. 2 in a partially folded state.
Figure 6:
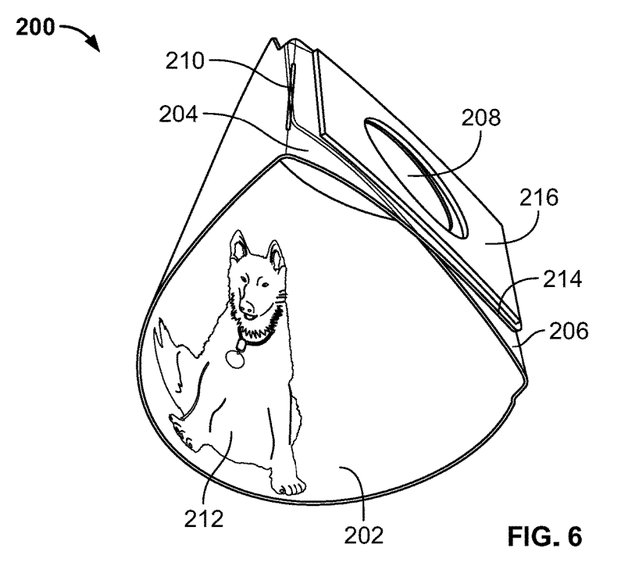
FIG. 6 is a perspective view of the novelty item of FIG. 2 in a fully folded state.
Figure 7:
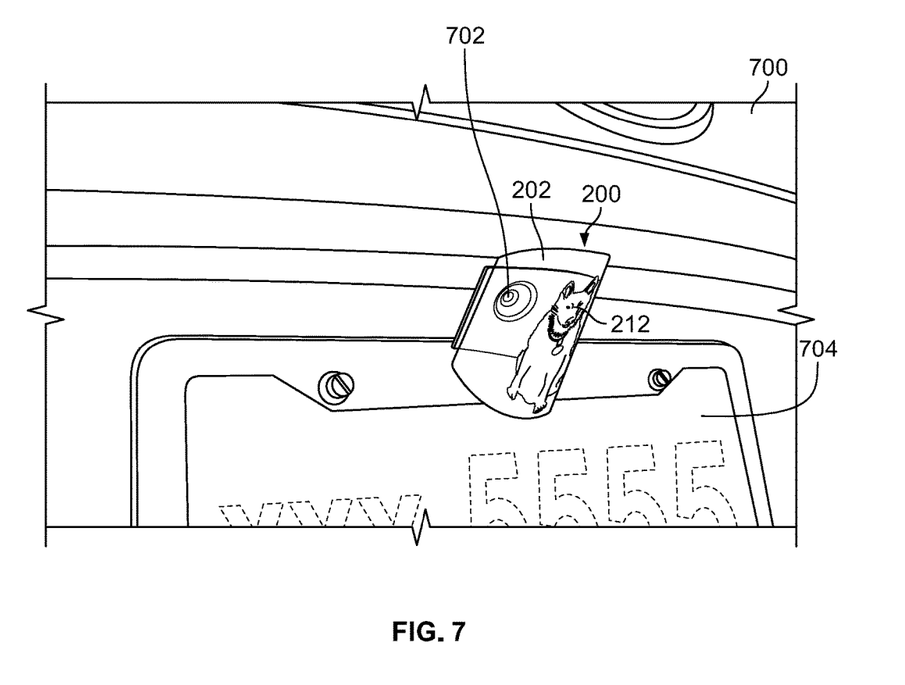
FIG. 7 is an exemplary view of the novelty item of FIG. 2 in a fully folded state and attached to a backup camera of a vehicle.

FIG. 5 shows the novelty item 200 as shown in a partially folded state and FIG. 6 shows the novelty item 200 as shown in a fully folded state with the flap portions 204 and 206 secured to one another. The flap portions 204, 206 can be bent and folded, and the slits 210 may facilitate such folding by a user. In the partially folded state shown in FIG. 5, it can be seen that the central portion 202 is still relatively flat when the flap portions 204, 206 are not yet fully folded. In the fully folded state shown in FIG. 6, it can be seen that the edges of the central portion 202 have been pulled to be slightly curved, due to the flap portions 204, 206 being secured to one another.

When the flap portions 204, 206 are fully folded, the flap portion 204 may be above the flap portion 206. In this way, the closing fastener 214 may be used to secure the flap portion 204 to the flap portion 206, and the mounting fastener 216 may be exposed such that it can be attached to a camera. In addition, the holes 208 in each of the flap portions 204, 206 may generally be aligned with one another and with the image 212 on the central portion 202. The holes 208 may define an opening such that a camera has an unobstructed view of the image 212 through the opening. The holes 208 may also minimize or eliminate distortion, dust, debris, etc. from obscuring the image 212 in the field of view of a camera.

The central portion 202 may be of a generally trapezoidal shape so that the image 212 is properly positioned when the novelty item 200 is fully folded and attached to a backup camera 702, such as shown in FIG. 7. In addition, the flap portions 204, 206 may be arranged to be attached to the central portion 202 at a slight upward angle, as best shown in FIG. 2. The combination of (1) the shape of the central portion 202; (2) the positioning of the flap portions 204, 206 at an angle from the central portion 202; and (3) the curvature of the central portion 202 when the flap portions 204, 206 are fully folded and secured to one another may allow the field of view of the camera 702 to be sufficiently covered by the novelty item 200.

In particular, when attached to a backup camera 702, the fully folded novelty item 200 may be at a slight angle so that the top edge of the central portion 202 is closer to the backup camera 702, as compared to the bottom edge of the central portion 202. This can enable the image 212 to be in proper focus for the camera 702, i.e., within the minimum focal distance of the camera 702. For example, in some embodiments, the top edge of the central portion 202 may be approximately ⅞" from the backup camera 702, the bottom edge of the central portion 202 may be approximately 1⅛" from the backup camera 702, and the image 212 may be approximately 1" from the backup camera 702. In other embodiments, the distances between the central portion 202 and the backup camera 702 may vary.

Furthermore, other shapes of the central portion 202 and flap portions 204, 206 are possible and contemplated. For example, the ends of the flap portions 204, 206 may be rounded or otherwise shaped, and/or the shape of the central portion 202 may be more square, rectangular, circular, or other shapes. In addition, the holes 208 in the flap portions 204, 206 may not be completely encompassed, as shown in the figures, but instead may be semi-circular notches at the ends of the flap portions 204, 206, or other suitable openings or shapes.

Because the novelty item 200 may be made of a transparent film and is relatively small, the novelty item 200 may be inconspicuous and may not be easily noticed by persons looking at the vehicle 700. As shown in FIG. 7, when the novelty item 200 is attached to the camera 702, the novelty item 200 may not obscure other parts of the vehicle 700, such as a license plate 704.

Figure 8:
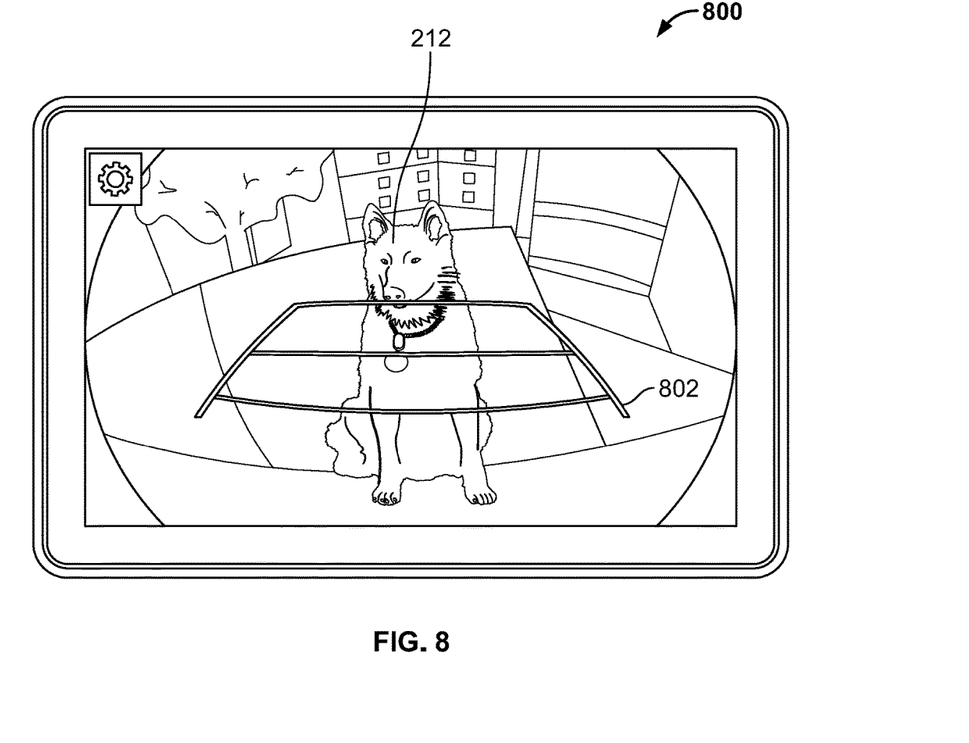
FIG. 8 is an exemplary view of a display connected to a backup camera of a vehicle and showing the exemplary image on a novelty item, as attached in FIG. 7.

FIG. 8 shows an exemplary view of a display 800 connected to the backup camera 702 of the vehicle 700, when the novelty item 200 is attached as shown in FIG. 7. The display 800 shows the image 212 on the central portion 202 of the novelty item 200, as well as other objects in the environment behind the vehicle 700. Due to the shape of the novelty item 200 when fully folded, as described above, the edges of the novelty item 200 may not be seen on the display 800. Accordingly, the image 212 shown on the display 800 may appear realistic to a driver of the vehicle 700, due to the opacity of the image 212. As seen in FIG. 8, the other objects in the environment, e.g., trees, buildings, etc., can still be clearly seen on the display 800, as are electronic overlays that are normally shown on the display 800, such as reference lines 802.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A novelty item for attachment to a vehicle backup camera, the novelty item adapted to present an illusion of an image in a field of view of the vehicle backup camera, the novelty item comprising:
  a central portion comprising:
    a white layer disposed thereon; and
    the image disposed on the white layer such that the image has opacity;
  a first flap portion flexibly connected to a first end of the central portion, the first flap portion having a first slit to facilitate folding;
  a second flap portion flexibly connected to a second end of the central portion, the second end opposite of the first end, the second flap portion having a second slit to facilitate folding, wherein the first flap portion overlaps with the second flap portion when the first and second flap portions are folded;
  a mounting fastener disposed on a front surface of the first flap portion, the mounting fastener adapted to attach the novelty item to the vehicle backup camera; and
  a closing fastener disposed on a rear surface of the first flap portion, the closing fastener adapted to secure the first and second flap portions together when the first and second flap portions are folded;
  wherein, when the first and second flap portions are folded and secured together:
    the first and second flap portions each comprise a hole that substantially aligns with the other hole and with at least a part of the image;
    each hole is adapted to accept the vehicle backup camera; and
    the image is substantially viewable in the field of view of the vehicle backup camera when the novelty item is attached to the vehicle backup camera.

2. The novelty item of claim 1, wherein a top edge of the central portion is adapted to be positioned closer to the vehicle backup camera than a bottom edge of the central portion, when the novelty item is attached to the vehicle backup camera.

3. The novelty item of claim 1, wherein the central portion and the first and second flap portions each comprise a transparent film.

4. The novelty item of claim 1, wherein the mounting fastener and the closing fastener each comprises double-sided tape.

5. The novelty item of claim 1, wherein the first and second slits each comprise a perforation adapted to allow the first and second flap portions to be detached from the central portion.

6. A novelty item for attachment to a vehicle backup camera, the novelty item adapted to present an illusion of an image in a field of view of the vehicle backup camera, the novelty item comprising:
  a central portion comprising the image;
  a first flap portion flexibly connected to a first end of the central portion;
  a second flap portion flexibly connected to a second end of the central portion, the second end opposite of the first end, wherein at least part of the first flap portion overlaps with at least part of the second flap portion when the first and second flap portions are folded;
  a mounting fastener adapted to attach the novelty item the vehicle backup camera; and
  a closing fastener adapted to secure the first and second flap portions together when the first and second flap portions are folded;
  wherein:
    the first and second flap portions each comprise an opening that is adapted to accept the vehicle backup camera; and
    the image is substantially viewable in the field of view of the vehicle backup camera when the novelty item is attached to the vehicle backup camera.

7. The novelty item of claim 6, wherein the first and second flap portions are flexibly connected respectively to the first and second ends of the central portion with a respective perforation, each perforation adapted to facilitate folding of the first and second flap portions and to allow the first and second flap portions to be detached from the central portion.

8. The novelty item of claim 6, wherein the first and second flap portions are flexibly connected respectively to the first and second ends of the central portion with a respective living hinge, each living hinge adapted to facilitate folding of the first and second flap portions.

9. The novelty item of claim 6, wherein the first and second flap portions each comprise a slit adapted to facilitate folding of the first and second flap portions.

10. The novelty item of claim 6, wherein the closing fastener is disposed on a front surface of the novelty item and the mounting fastener is disposed on a rear surface of the novelty item.

11. The novelty item of claim 6, wherein the closing fastener is disposed on a front surface of the first flap portion or the second flap portion, and the mounting fastener is disposed on a rear surface of the other of the first flap portion or the second flap portion.

12. The novelty item of claim 6, wherein:
the first and second flap portions each comprises an open-ended slit; and
the open-ended slits are adapted to interlock with one another to secure the first and second flap portions together.

13. The novelty item of claim 6, wherein a top edge of the central portion is adapted to be positioned closer to the vehicle backup camera than a bottom edge of the central portion, when the novelty item is attached to the vehicle backup camera.

14. The novelty item of claim 6, wherein:
the central portion and the first and second flap portions each comprise a transparent film; and
a front surface of the central portion comprises the image disposed thereon such that the image has opacity.

15. The novelty item of claim 6, wherein:
the central portion and the first and second flap portions each comprise a transparent film; and
a front surface of the central portion comprises a white layer disposed thereon and the image disposed on the white layer such that the image has opacity.

16. The novelty item of claim 6, wherein:
the central portion and the first and second flap portions each comprise a transparent film; and
a rear surface of the central portion comprises the image disposed thereon and a white layer disposed on a rear of the image such that the image has opacity.

17. The novelty item of claim 6, wherein the mounting fastener and the closing fastener each comprises double-sided tape.

18. A novelty item for attachment to a vehicle backup camera, the novelty item adapted to present an illusion of an image in a field of view of the vehicle backup camera, the novelty item comprising:
a central portion comprising a front surface having the image disposed thereon;
a first flap portion flexibly connected to a first distal end of the central portion and comprising a first hole;
a second flap portion flexibly connected to a second distal end of the central portion and comprising a second hole;
a mounting fastener adapted to attach the novelty item to the vehicle backup camera; and
a closing fastener adapted to secure the first and second flap portions together when the first and second flap portions are fully articulated to lie in contact with one another;
wherein:
the first and second holes are adapted to accept the vehicle backup camera and define an opening therethrough; and
the vehicle backup camera has an unobstructed view of the image through the opening when the novelty item is attached to the vehicle backup camera.

19. The novelty item of claim 18, wherein the first and second flap portions are flexibly connected respectively to the first and second ends of the central portion with on of a respective perforation, living hinge, or slit that is adapted to facilitate folding of the first and second flap portions.

20. The novelty item of claim 18, wherein:
the central portion and the first and second flap portions each comprise a transparent film; and
the front surface of the central portion comprises a white layer disposed thereon and the image disposed on the white layer such that the image has opacity.

* * * * *